United States Patent [19]

Lohmer et al.

[11] Patent Number: 5,078,027
[45] Date of Patent: Jan. 7, 1992

[54] DRIVE SYSTEM ASSEMBLY FOR TRACKED VEHICLE

[75] Inventors: Helmut Lohmer, Augsburg; Rudi Reppert, Fussen; Franz-Xaver Zaunberger, Augsburg, all of Fed. Rep. of Germany

[73] Assignee: Renk Aktiengesellschaft, Fed. Rep. of Germany

[21] Appl. No.: 640,991

[22] Filed: Jan. 14, 1991

[30] Foreign Application Priority Data

Jan. 31, 1990 [DE] Fed. Rep. of Germany ....... 4002791

[51] Int. Cl.$^5$ .................. F16H 57/12; F16H 57/02
[52] U.S. Cl. ................................. 74/606 R; 180/292
[58] Field of Search ............. 74/606 R; 180/292, 6.7

[56] References Cited

U.S. PATENT DOCUMENTS

| | | | |
|---|---|---|---|
| 3,872,939 | 3/1975 | Eckert | 74/606 R X |
| 3,893,531 | 7/1975 | Gee | 74/606 R X |
| 4,122,730 | 10/1978 | Weiland | 74/606 R |
| 4,137,794 | 2/1979 | Horstmann et al. | 74/606 R |
| 4,524,638 | 6/1985 | Van Hee | 74/606 R |
| 4,756,208 | 7/1988 | Hayashi et al. | 74/606 R X |
| 4,941,544 | 7/1990 | Fischle et al. | 180/292 |
| 5,007,307 | 4/1991 | Tamazawa et al. | 74/606 R |
| 5,014,812 | 5/1991 | Kazama | 180/292 |

*Primary Examiner*—Richard Lorence
*Assistant Examiner*—Daniel Wittels
*Attorney, Agent, or Firm*—Natter & Natter

[57] ABSTRACT

A drive system for a tracked vehicle includes an engine carried in an engine housing and a transmission carried in a transmission housing. The axes of rotation of an engine output shaft, a drive transmission input and drive transmission output shaft are parallel to each other. Drivingly interconnecting the engine output shaft and the transmission input is a transfer gear carried in a transfer housing. The transfer housing is rigidly connected to the engine housing and drivingly engages the transmission input through a rotational coupling which permits radial and skew angular offsets between an axis of rotation of the transfer gear output and the axis of rotation of the transmission input to accommodate dimensional variation in the drive system components from ideal specified dimensions without stress. The engine housing and the transmission housing are detachably interconnected at their respective longitudinal ends by connecting links which permit limited movement of the housings relative to one another except about the main axes of rotation. As a result, drive transmission functions as a unitary mass in a horizontal plane and may be supported from three bearing mounts to which engine frame supports are connected.

15 Claims, 3 Drawing Sheets

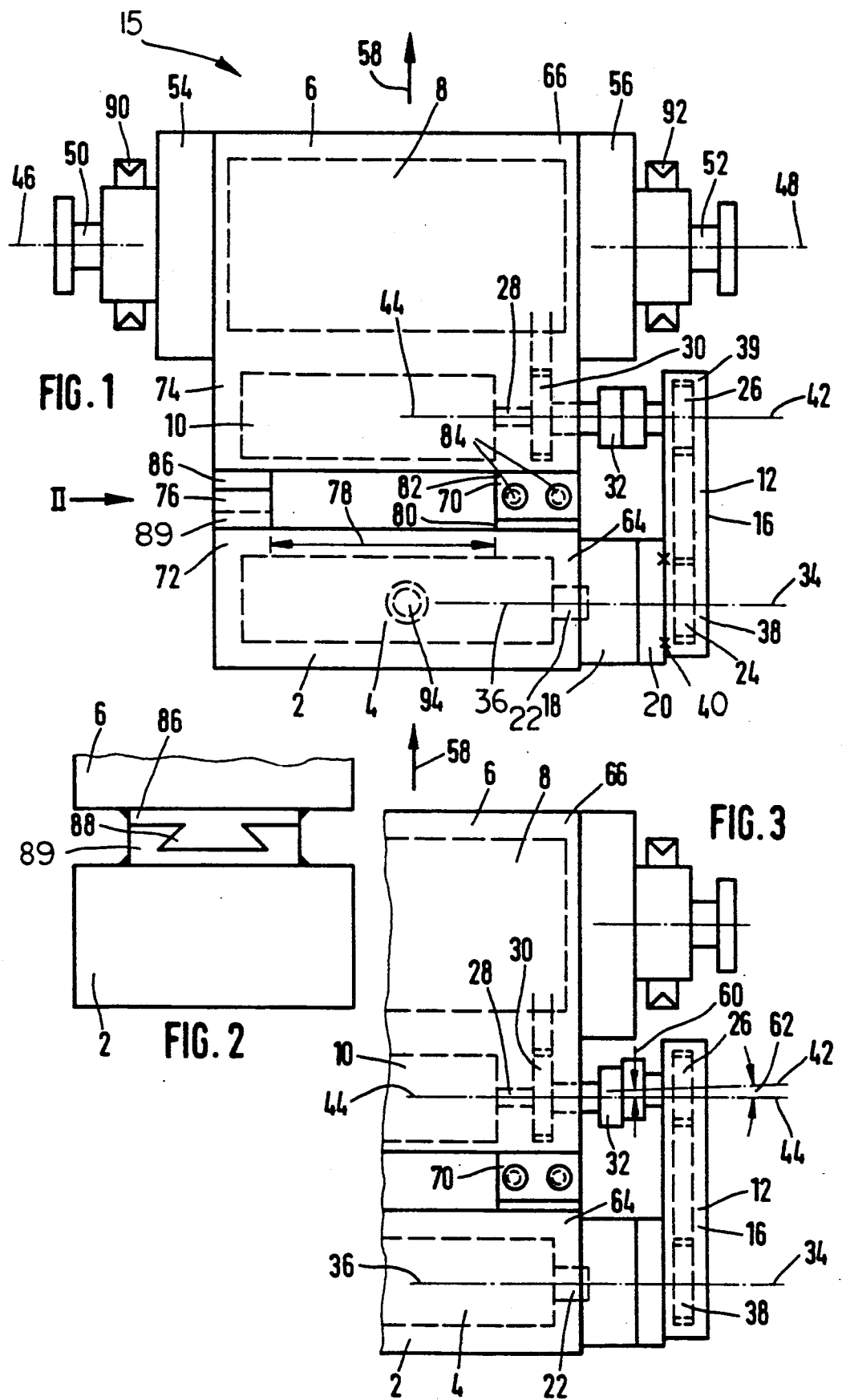

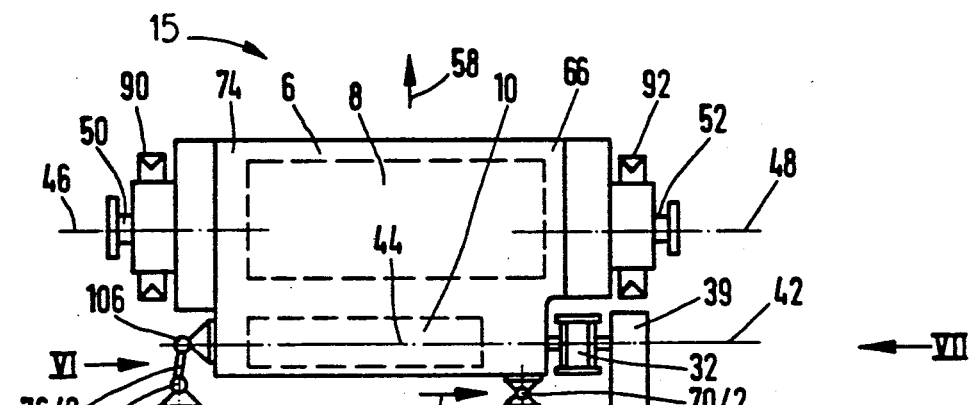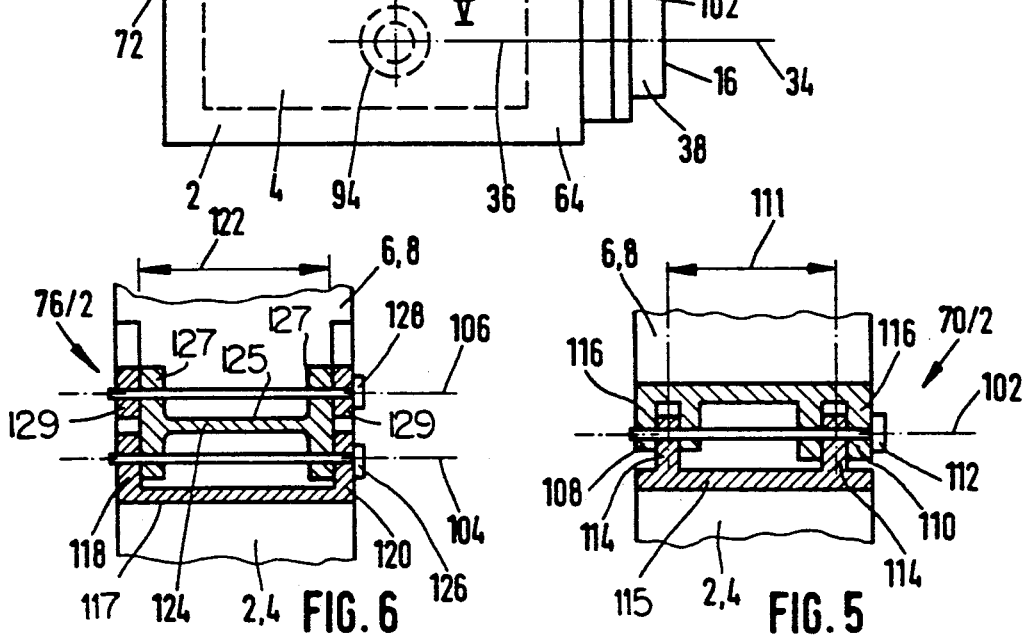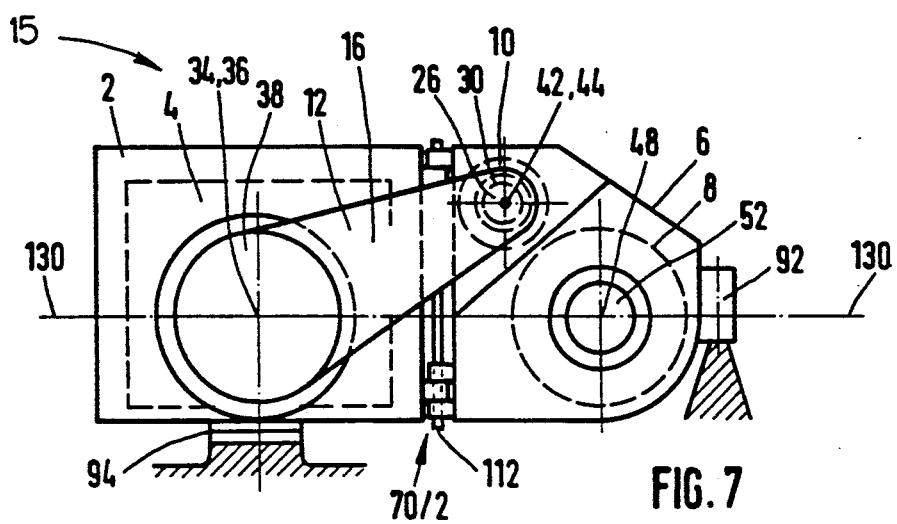

DRIVE SYSTEM ASSEMBLY FOR TRACKED VEHICLE

BACKGROUND OF THE INVENTION

1. Field of the Invention

This invention relates generally to drive systems for tracked vehicles and more particularly to drive systems wherein the axes of rotation of an engine and a drive transmission are arranged parallel to each other and with their respective housings secured to one another.

2. Related History

Drive systems for tracked vehicles such as tanks and earth moving equipment have utilized component arrangements wherein the axes of rotation of a vehicle engine and the drive transmission were arranged parallel to one another and transverse to the direction of forward vehicle travel. Such component arrangement included a transfer gear comprising a gear train which interconnected the engine output shaft with a transmission input shaft. The housings for the main drive system components, i.e. the engine, the drive transmission and the transfer gear, were rigidly secured to one another. Such arrangement, while reducing overall space requirements for the drive system, resulted in undue internal stresses and component distortions, particularly in larger drive systems.

In order to reduce internal distortions, one prior approach to component arrangement included a cantilevered mounting of either the engine or the drive transmission on the transfer gear housing. While such arrangement reduced internal distortions in the components, the transfer gear was subject to higher stressing which necessitated larger gearings which were costly, heavier, and occupied more space within the vehicle. Further, the cantilever mounting arrangement did not facilitate rapid servicing of defective or worn components or permit removal and replacement without undue labor.

SUMMARY OF THE INVENTION

In compendium, the invention comprises tracked vehicle drive system which includes an engine carried in an engine housing and a transmission carried in a drive transmission housing with the axes of rotation of the engine and drive transmission being parallel. A transfer gear train carried in a transfer housing interconnects the engine and the transmission.

In order to compensate for manufacturing tolerances as well as thermal expansion and contraction resulting in dimensional changes without stressing the drive system, the transfer gear housing is rigidly connected to one of the drive system housing component and is connected to the other drive system component by a yieldable coupling which permits transverse and angular offset between its driving and driven ends.

Additionally, the engine housing and transmission housing are detachably interconnected at their respective longitudinal ends. The connection between the engine housing and the transmission housing is rigid in directions about and transverse to the axes of rotation yet preferably permits axial movement of the housings relative to one another.

In one embodiment, a sliding dovetail connection is provided to detachably join common ends of the engine housing and the transmission housing while a pivotal linkage is employed in another embodiment. A further embodiment employs a flexible plate which spans between the engine housing and the transmission housing at each of the common housing ends. The plate is capable of flexing to permit limited movement of the respective housings in a direction parallel to the axes of rotation.

From the foregoing compendium, it will be appreciated that it is a consideration of the present invention to provide a drive system assembly of the general character described which is not subject to the disadvantages of the related history aforementioned.

An aspect of the present invention is to provide a drive system assembly of the general character described which precludes internal distortions in an engine, in a transfer gear train and in a drive transmission when such components experience dimensional changes under the influence of temperature.

A further consideration of the present invention is to provide a drive system assembly of the general character described which facilitates rapid disassembly for replacement of an engine, a drive transmission or a transfer gear.

To provide a drive system assembly of the general character described which is relatively light in weight it is yet another aspect of the present invention.

It is a further feature of the present invention to provide a drive system assembly of the general character described wherein reactive forces generated from the output torque of a drive transmission are absorbed at load bearing mounts of the drive system without stressing a transfer gear.

Yet a further consideration of the present invention is to provide a drive system assembly of the general character described which is well suited for economical mass production fabrication.

To provide a drive system assembly of the general character described which may be mounted within a tracked vehicle so that when the vehicle is twisted, the drive system will not be subject to distortions yet a further aspect of the present invention.

Another feature of the present invention is to provide a drive system assembly of the general character described wherein an engine and a drive transmission are quickly detachable from one another.

Other aspects, features and considerations of the present invention in part will be obvious and in part will be pointed out hereinafter.

With these ends in view, the invention finds embodiment in certain combinations of elements, arrangement of parts and series of steps by which the said aspects, features and considerations and certain other aspects, features and considerations are attained, all with reference to the accompanying drawings, and the scope of which will be more particularly pointed out and indicated in the appended claims.

BRIEF DESCRIPTION OF DRAWINGS

In the accompanying drawings in which are shown some of the various possible exemplary embodiments of the invention, FIG. 1 is a schematized plan view of a drive system assembly for a tracked vehicle constructed in accordance with the invention shown in an ideal dimensional state;

FIG. 2 is a fragmentary auxiliary view of an end of an engine housing and an end of a transmission housing joined together with a mating dovetail rail and groove, the view being taken substantially in the direction of arrow II of FIG. 1;

FIG. 3 is a fragmentary plan view of the drive system assembly of FIG. 1 with the components being of slightly different dimensions;

FIG. 4. is a plan view of further embodiment of the drive system assembly of the invention wherein an engine housing and a transmission housing are connected to one another with a single axis hinge link at one end and a double axis hinge link at the other end;

FIG. 5 is a view in section, through the single axis hinge link, the same taken substantially in the direction of arrow V of FIG. 4;

FIG. 6 is an auxiliary view in section taken through the double axis hinge pivotal link, substantially in the direction of arrow VI of FIG. 4;

FIG. 7 is an end elevational view of the drive system assembly, substantially in the directional arrow VII of FIG. 4.

DESCRIPTION OF THE PREFERRED EMBODIMENTS

Figure 8:
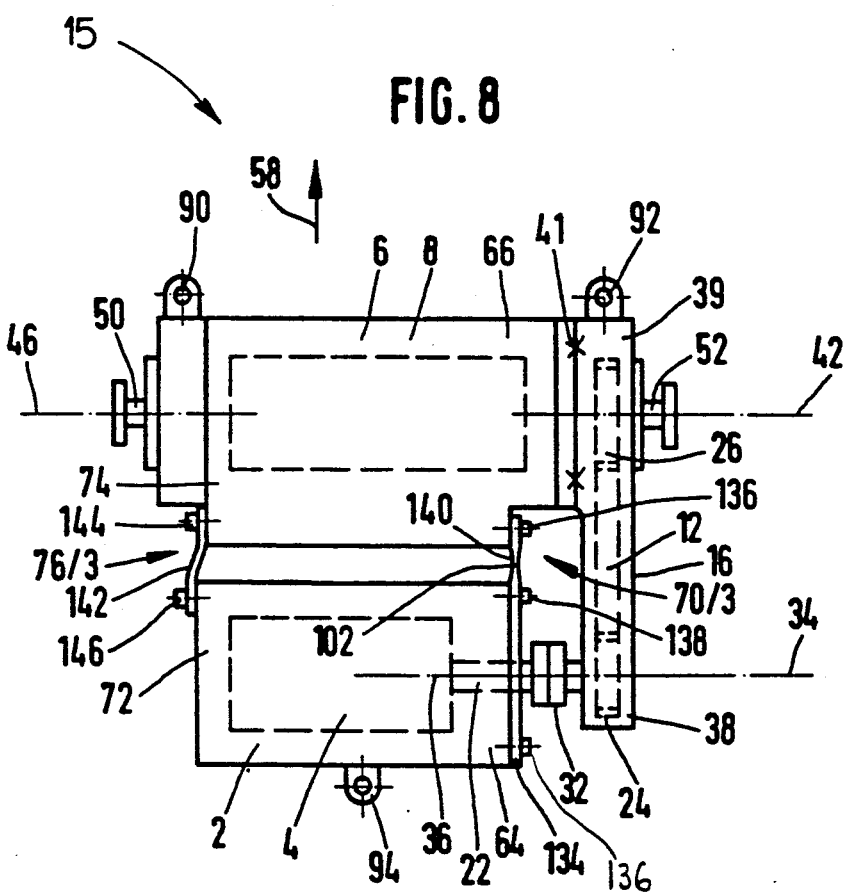
FIG. 8 is a plan view of a still further embodiment of the invention wherein flexible plates are utilized to join the ends of an engine housing to the ends of the a transmission housing while permitting limited movement in a direction parallel to the common axes of an engine and a drive transmission and showing a transfer gear rigidly connected to a transmission housing rather to an engine housing.

Referring now in detail to the drawings, the reference numeral 15 denotes generally a drive system for a tracked vehicle constructed in accordance with and embodying the present invention. The drive system 15 includes an engine 4 having an output shaft 22 which rotates about an axis 36. The engine 4 is carried within a rigid engine housing 2.

A separate rigid transmission housing 6 carries both a drive transmission 8 and a steering drive 10. The output of the transmission 8 is transmitted through a pair of output shafts 50, 52, which rotate about coaxial axes 46, 48 respectively. In a manner well known, the output shafts 50, 52, drive sprocket wheels which engage tracks to propel the vehicle in a forward propulsion direction generally indicated by the heavy arrow 58 of FIG. 1.

Steering control is provided by the steering drive 10 which includes an input shaft 28 rotating about an axis 44. The output of the steering drive 10 is superimposed upon two planetary gears (not shown) to provide superposition steering control of the vehicle with each output shaft 50, 52 being driven by the output of one of the planetary gears, all as shown in U.S. Pat. No. 4,428,445. A brake assembly 54, 56 may be associated with each output shaft 50, 52 respectively as shown, for example, in U.S. Pat. No. 4,890,508. The employment of brake assemblies is optional, however.

Driving power is transmitted from the engine output shaft 22 through a hydrodynamic torque convertor 18 and a clutch 20 to a transfer gear 12 which comprises a gear train. The gear train of the transfer gear 12 is carried within a rigid transfer housing 16. Included within the transfer gear 12 is an input gear 24, which rotates about an axis 34 at an input end 38. The input axis 34 is coaxial with the axis 36 of the engine output shaft 22.

At an output end 39 of the transfer gear 12, a driven gear 26 having an axis 42 is provided. The transfer gear 12 may include one or more intermediate gears carried within the transfer housing 16 to drivingly interconnect the input gear 24 with the output gear 26.

In accordance with the invention, the transfer gear housing 16 is rigidly connected only to one of the housings 2, 6, in this instance, the engine housing 2 at the transfer gear input end 38. Such rigid interconnection is schematically illustrated in FIG. 1 by a pair of X marks denoted by the numeral 40. Thus, the input gear axis of rotation 34 is in fixed alignment and cannot move relative to the axis 36 of the engine output shaft 22.

Turning now to the output end 39 of the transfer gear 12, the output gear 26 is interconnected to a transmission input gear 30 through a rotational coupling 32. In accordance with the invention, the rotational coupling 32 is capable of transmitting rotation while accommodating axis dislocations between its input and output. Suitable rotational couplings which may be selected for employment in the present invention may include, for example, double jointed gear couplings, membrane couplings or similar torque transmission devices which will operate while accommodating transverse as well as axial deflections between its input and output. The output end of the rotation coupling 32 is drivingly connected to the transmission input gear 30 as well as the input shaft 28 of the steering drive 10.

It should be appreciated that should the distance between the input and output axes of rotation 34, 42 of the transfer gear 12 change due to thermal expansion or contraction, for example, the axis of rotation 34 at the input end 38 will always remain coaxial with the axis of rotation 36 of the output shaft 22, due to the rigid connection between the engine housing 2 and the input end 38 of the transfer housing 16.

At the output end 39 of the transfer gear 12, however, the axis of rotation 42 is capable of changing its position in relation to the axis of rotation 44 which is common to the input shaft 28 of the steering gear 10 and the input gear 30 of the drive transmission 8. Such change in position may comprise a shift in the axis of rotation 42 parallel and/or skew to the axis of rotation 44 as illustrated in FIG. 3. The rotary driving connection between the output gear 26 and the input gear 30 and input shaft 28 remains, however, uninterrupted due to the capability of the rotational coupling 32 to accommodate axis dislocations between its input and its output.

Referring now in greater detail to FIG. 3, it will be seen that the axis of rotation 42 of the output gear 26 has been displaced or offset in a transverse radial direction as indicated by the space between arrows 60 and has also been angularly offset or skewed as indicated by the space 62 between a pair of arcuate arrows.

One may appreciate that the radial displacement 60 and angular offset 62 between the axis of rotation 44 of the inputs to the steering drive and drive transmission and the axis 42 of the output gear 26 may result not only from thermal expansion or contraction but also may be the product of manufacturing tolerances and may appear upon initial assembly of the engine housing 2, the transmission housing 6 and the transfer housing 16 into the composite drive system 15 or upon replacement of one of the housings in an existing drive system.

The engine housing 2 includes a longitudinal end 64 facing the transfer gear 12 and an opposite longitudinal end 72 facing away from the transfer gear. Similarly, the transmission housing 6 includes an end 66 facing the transfer gear 12 and an opposite end 74 facing away from the transfer gear. In accordance with the invention, the engine housing 2 and the transmission housing 6 are detachably connected to one another adjacent their common ends 64, 66 and 72, 74.

At the ends 64, 66, a rigid yet detachable connecting link 70 extends between the engine housing 2 and the transmission housing 6. Similarly, at the ends 72, 74 a rigid yet detachable link 76 spans between the engine housing 2 and the transmission housing 6. Preferably, the connecting links 70, 76 are spaced apart a maximum longitudinal distance relative to the total length of the housings 2, 6 as indicated by the double headed arrow 78 of FIG. 1.

The connecting link 76 is configured to permit relative movement between the engine housing 2 and the transmission housing 6 only a longitudinal plane, that is a plane parallel to the fixed or main axes of rotation 34, 36, 44, 46 and 48.

The connecting link 70 includes a transverse web 80 which extends from the side of the engine housing 2 toward the transmission housing 6 and a transverse web 82 which extends from the transmission housing 6 toward the engine housing 2. A pair of bolts 84 extend through registered apertures in the webs 80, 82 for the purpose of rigidly yet detachably interconnecting the housings 2, 6.

At the opposite ends of the housings 2, 6, the connecting link 76 extends between the respective housings. As discussed, the connecting link 76 permits movement between the engine housing 2 and the transmission housing 6 only in a longitudinal plane. The connecting link 76 includes a plate 86 which projects from the transmission housing 6 toward the engine housing 2. The plate 86 includes a central longitudinal dovetail rail 88. The dovetail rail 88 is received within a mating longitudinal groove formed in a plate 89 which projects from the engine housing 2 toward the transmission housing 6 as illustrated in FIG. 2.

It is evident that the dovetail interconnection between the plates 86, 89 provides a link between the housings 2, 6 which is rigid with respect to movement between the housings 2, 6 except in a longitudinal direction parallel to the rotational axes 34, 36, 44, 46 and 48. Changes in the lengths of the housings 2, 6 due to temperature variation will be accommodated only at the ends 72, 74 facing away from the transfer gear 12; the rigid link 70 maintains dimensional stability of the housings 2, 6 relative to the transfer gear. The housings cannot be twisted relative to each other about any of the axes of rotation. As a result, the connecting links 70, 76 function to configure the entire drive system 15 as a unitary rigid aggregate relative to planes parallel to or including the main axes 34, 36, 44, 46 or 48, such as the plane of FIG. 1. As will be later described, the axes 34, 36, 42, 44, 46 and 48 lie in a common horizontal plane.

Because the drive system 15 is essentially rigid about the horizontal plane of the axes, the drive system 15 may be mounted within a vehicle with vehicle frame supports contacting the drive system 15 at only three load bearing mounts which define a support plane. Preferably, two spaced bearing mounts 90, 92 are positioned adjacent the ends, 74, 66 respectively of the transmission housing 6. The mounts 90, 92 are positioned for contact with the vehicle frame supports in a plane below the axes of rotation of the transmission output shafts 50, 52. A third bearing mount, 94 is preferably located at the approximate center of gravity of the combined engine housing 2 and the transfer housing 16 because the transfer housing 16 is rigidly interconnected to the engine housing, weights of both loads are supported as a single mass.

A further embodiment of the invention is illustrated in FIGS. 4, 5 and 6 wherein like numerals have been employed to denote like components of the prior embodiment. In this embodiment, all components are substantially identical to the components previously described except with respect to connecting links which interconnect an engine housing 2 to a transmission housing 6. In lieu of a connecting link 70, of the prior embodiment, a single axis hinge link 70/2 is utilized to detachably interconnect the engine housing 2 and the transmission housing 6 at an end 64, 66 of the housings 2, 6 respectively. The connecting link 70/2 includes a plate 116 which extends from the transmission housing 6 and a plate 115 which projects from the engine housing 2.

The plate 116 includes a clevy 108 at its top and a further clevy 110 at its bottom. The clevys 108, 110 project toward the engine housing 2. Projecting from the plate 115 and toward the transmission housing 6 are a pair of webs 114 which extend into the space between the legs of each clevy 108, 110. To complete the single axis hinge link 70/2, a hinge pin 112 passes through registered apertures in the clevys and each web. The plate 116 and transmission housing 6 may thus rotate relative to the plate 115 and the engine housing 2 about a vertical axis 102 of the hinge pin 112. The vertical axis 102 is perpendicular to the plane of FIG. 4.

In order to maximize the stiffness of the connecting link 70/2 against torque moments tending to rotate the housings 2, 6 about the main axes 34, 36, 44, 46 and 48, a distance 111 between the centers of each clevy is selected to be as great as possible relative to the height of the housings 2, 4, as illustrated in FIG. 7.

For the purpose of detachably interconnecting the engine housing 2 and the transmission housing 6 at a pair of opposite housing ends, 72, 74 respectively, a double axes hinge link 76/2 is utilized. The double axes hinge link 76/2 includes a plate 117 which extends from a side of the engine housing 2 toward the transmission housing 6. A perpendicular flange 118, 120 projects toward the transmission housing from the top and bottom of the plate 117 with the flanges 118, 120 being parallel to one another. Seated between the flanges 118, 120 is an I link 124 which includes a transverse web 125 and a pair of end flanges 127, with the flanges 127 being parallel to one another.

Projecting away from the transfer gear 12 at the end 74 of the transmission housing 6, is a pair of spaced support posts 129. The support posts 129 include inner faces which abut the outer faces of the I link flanges 127.

A hinge pin 126 extends through registered apertures in the end flanges 118, 120 of the plate 117 and the flanges 127 of the I link 124. Similarly, a hinge pin 128 extends through registered apertures in the support posts 129 and the flanges 127 of the I link 124. The pins 126, 128 have parallel axes 104, 106 respectively, which are perpendicular to the main axes 36, 34, 44, 46 and 48.

In order to maximize rigidity of the double axes hinge link 76/2, the distance 122 between the abutting surfaces of the flanges 118, 127 and 120, 127 and of the flanges 127 and the support posts 129 is as great as possible given the dimensions of the housings 2, 6 so that twisting moments about the main axes will not deflect the drive system 15.

It should be appreciated that the double axes hinge link 76/2 permits movement of the engine housing 2 and transmission housing 6 relative to one another at the ends 72, 74 in directions substantially parallel to the main axes as well as relative movement of the housings 2, 6 towards and away from each other in directions substantially perpendicular to the main axes.

It should also be noted that in the embodiment of FIGS. 1-3 the axis of rotation 42 of the output gear of the transfer gear 12 lie in the common plane of the main axes, 34, 36, 44, 46 and 48.

With attention now directed to FIG. 7 which illustrates a side elevational view of the alternate embodiment, it will be seen that the length of the drive system 15 in the travel direction 58 is substantially reduced by elevating the axes of rotation 42, 44 from a horizontal common plane 130 of the axes of rotation 34, 36, 46 and 48. Alternately, the axes of rotation 42, 44 may be lowered rather than elevated to achieve the same savings in overall length. Elevation of the axes 42, 44 entails movement of the steering drive 10 to a position above that of the drive transmission 8.

A further embodiment of the drive system is illustrated in FIG. 8 wherein like numerals have been employed to denote like components of the previous embodiments. A drive system 15 of such embodiment differs from that of the embodiment of FIGS. 1-3 with respect to the interconnection between a transfer gear 12 and a transmission housing 6.

Rather than rigidly connecting a transfer housing 16 to an engine housing 2 at an input end 38 of the transfer gear 12, the transfer housing 16 is rigidly connected to the transmission housing 6 at an output end 39 of the transfer gear 12 as shown by X marks 41.

At the input end 38 of the transfer gear 12, driving connection between an engine output shaft 22 having an axis 36 and a transfer input gear 24 having an axis 34 is achieved through a rotational coupling 32 which is identical to that previously described and shown with respect to the prior embodiments.

When the distance between the transfer gear input axis 34, and an output axis 42 varies from the ideal specified dimension due to temperature induced dimensional changes or manufacturing tolerances, the rotational coupling 32 absorbs axis dislocations between the transfer gear input axis 34 and the engine output shaft axis 36.

It should also be observed that the drive system 15 of the embodiment of FIG. 8 differs from the drive systems of the prior embodiments with respect to the employment of a connecting link 70/3 which spans between the engine housing 2 and the transmission housing 6 at a pair of housing ends 64, 66 facing the transfer gear 12 and a connecting link 76/3 which spans between the housings 2, 6 at the opposite ends 72, 74 respectively.

At the ends 64, 66 facing the transfer gear 12, the housings 2, 6 are spaced from one another by the connecting link 70/3 which includes a plate 134 formed of flexible material. The plate 134 is releasably fastened to the end faces of the housings 2, 6 by a plurality of bolts 136, 138. A vertical reduced thickness zone 140 of the plate 134 forms a vertical pivot axis 102. With attention now directed to the opposite housing ends 72, 74, the connecting link 76/3 includes a plate 142 of flexible material. The plate 142 is detachably fastened across the end faces of the housings 2, 6 by a plurality of bolts 144, 146. The plate 142 permits the housings 2, 6 to move relative to one another in a lengthwise direction while the plate 134 permits pivotal movement of the housings 2, 6 about the axis 102.

It should be appreciated that the plate 134 functions in a manner analogous to the single axis hinge link 70/2 while the plate 142 functions in a manner analogous to the double axis hinge link 76/2. Both plates 134, 142 are rigid in a vertical plane and thus resist torque load induced movement of the housings 2, 6 about the axes 36, 42, 46 and 48.

In a manner similar to that described and shown with respect to the previous embodiments, the drive system of the FIG. 8 embodiment is essentially rigid about a horizontal plane and is carried within a tracked vehicle with three vehicle frame supports engaging the entire drive system 15 at only three load bearing mounts which define a support plane. Preferably, two spaced mounts 90, 92 are positioned adjacent the longitudinal ends of the transmission housing 6 while the third mount 94 is positioned adjacent the approximate center of gravity of the transmission housing 2. Since the engine housing 2 carries only the mass of the engine and not that of the transfer gear 12, the mount 94 is centrally located lengthwise with respect to the engine housing 2. The mount 94 illustrated in FIG. 1 and FIG. 4 is offset toward the transfer gear 12 since, in such embodiment, the transfer gear and engine load are carried by the engine housing.

Thus it will be seen that there is provided a drive system assembly for tracked vehicles which achieves the various aspects, features and considerations of the present invention and which is well adapted to meet the conditions of practical usage.

As various changes might be made as above set forth, it is to be understood that all matters herein described or shown in the accompanying drawings is to be interpreted as illustrative and not in a limiting sense.

Having thus described the invention, there is claimed as new and desired to be secured by letters patent:

1. A drive system assembly for a tracked vehicle, the drive system assembly including a first drive component comprising an engine, a main housing, the engine being carried in the main housing, a second drive component comprising a drive transmission, a further main housing, the drive transmission being carried in the further main housing and a transfer gear drivingly interconnecting the engine and the drive transmission, a transfer housing, the transfer gear being carried in the transfer housing, the engine including an output shaft having a rotational axis, the transmission including an input and at least one output shaft having a rotational axis, the axis of rotation of the engine output shaft being parallel to the axis of rotation of the transmission output shaft, means rigidly interconnecting the transfer housing with only one of the main housings, the transfer gear having an input which rotates about an input axis and an output which rotates about an output axis, the transfer gear input being drivingly connected to the engine output shaft and the transfer gear output being drivingly connected to the transmission input, the drive connection between the transfer gear and one of the drive components carried in one of the main housings being rigid, the drive connection between the transfer gear and the other drive component carried in the other main housing including a rotational coupling, the rotational coupling having means for accommodating axis dislocations between the axis of the transfer gear and the other drive component, the drive system further including means detachably interconnecting the one main housing and the other main housing, the interconnecting means including means for permitting limited movement of the main housings relative to one another.

2. A drive system assembly constructed in accordance with claim 1 wherein the one main housing and the other main housing each include a longitudinal end facing the transfer gear and a longitudinal end facing away from the transfer gear, the means detachably interconnecting the one main housing and the other main housing including a connecting link joining the one main housing and the other main housing adjacent the ends facing the transfer gear and a further connecting link joining the one main housing and the other main housing adjacent the ends facing away from the transfer gear.

3. A drive system assembly constructed in accordance with claim 2 wherein the connecting link which joins the one main housing and the other main housing adjacent the ends facing away from the transfer gear includes means for permitting movement of the one main housing relative to the other main housing in a longitudinal direction substantially parallel to the axes of rotation of the engine output shaft and the transmission output shaft.

4. A drive system assembly constructed in accordance with claim 3 wherein the connecting link which joins the one main housing and the other main housing adjacent the ends facing away from the transfer gear includes means which permit movement of the one main housing relative to the other main housing toward and away from each other in a plane which extends through the rotational axes of the engine output shaft and the rotational axes of the transmission output shaft.

5. A drive system assembly constructed in accordance with claim 2 wherein the connecting link joining the one main housing and the other main housing adjacent the ends facing the transfer gear includes means rigidly interconnecting the one main housing and the other main housing.

6. A drive system assembly constructed in accordance with claim 2 wherein the connecting link interconnecting the one main housing and the other main housing adjacent the ends facing the transfer gear includes a single vertical pivot axes.

7. A drive system assembly constructed in accordance with claim 1 further including means rigidly interconnecting the transfer gear housing and the one main housing to form one rigid unit of the drive system, the other main housing forming another rigid unit of the drive system, the means detachably interconnecting the one main housing and the other main housing detachably interconnecting the rigid units, the interconnecting means including means which prohibit movement of the units relative to one another except within a common plane of the engine output shaft axis and transmission output shaft axis, the units including only three bearing mounts each, bearing mount for engagement with a support surface within the vehicle.

8. A drive system assembly constructed in accordance with claim 7 wherein one of the bearing mounts is positioned below the center of gravity of a unit which carries the engine and two other bearing mounts are positioned adjacent the longitudinal ends of the unit which carries the transmission.

9. A drive system assembly constructed in accordance with claim 1 further including a steering drive, the steering drive having a rotational input, the steering drive input and the drive transmission input being coaxial and in driving connection with the output of the transfer gear.

10. A drive system assembly constructed in accordance with claim 1 wherein the transmission input includes a rotational axis, the output axis of the transfer gear and the input axis of the transmission being substantially parallel to the axes of rotation of the engine output shaft and the transmission output shaft and lie shaft in a plane offset relative to a common plane of the engine output shaft axis and transmission output shaft axis, whereby the length of the drive system in the direction of forward vehicle travel is reduced.

11. A drive system assembly constructed in accordance with claim 1 wherein the one drive component carried in the one main housing comprises the engine.

12. A drive system assembly constructed in accordance with claim 1 wherein the one drive component carried in the one main housing comprises the drive transmission.

13. A drive system assembly constructed in accordance with claim 1 wherein the rotational coupling includes means for accommodating skew axis dislocations in the driving connection between the transfer gear and the other drive component carried in the other main housing.

14. A drive system assembly constructed in accordance with claim 1 wherein the means for accommodating axis dislocations includes means for accommodating a radial offset axis dislocation between the transfer gear and the other drive component carried in the other main housing.

15. A drive system constructed in accordance with claim 1 wherein the drive transmission includes a pair of output shafts, the output shafts having coplanar axes.

* * * * *